United States Patent [19]

Howard

[11] Patent Number: 4,824,450
[45] Date of Patent: Apr. 25, 1989

[54] AIR FILTER APPARATUS

[76] Inventor: Arthur G. Howard, 8761 LeMode Ct.-C, Indianapolis, Ind. 46268

[21] Appl. No.: 122,831

[22] Filed: Nov. 19, 1987

[51] Int. Cl.$^4$ .................. B01D 29/14; B01D 29/24
[52] U.S. Cl. .................. 55/274; 55/341.2; 55/341.3; 55/368; 55/375; 55/378; 55/380
[58] Field of Search ............ 55/274, 341 NT, 341 M, 55/341 H, 341 PC, 367, 368, 374–378, 380–382

[56] References Cited

U.S. PATENT DOCUMENTS

| | | | |
|---|---|---|---|
| Re. 18,822 | 5/1933 | Paine | 55/341 NT X |
| 940,076 | 11/1909 | Seaver | 55/341 NT X |
| 2,014,298 | 9/1935 | Schneible | 55/341 NT X |
| 2,667,233 | 1/1954 | Vedder | 55/341 NT X |
| 2,790,509 | 4/1957 | Share | 55/341 NT X |
| 2,805,731 | 9/1957 | Kron | 55/375 |
| 2,823,762 | 2/1958 | Bunnell | 55/341 NT X |
| 2,848,062 | 8/1958 | Meyerhoefer | 55/382 X |
| 3,344,589 | 10/1967 | Smith | 55/341 NT X |
| 3,370,405 | 2/1968 | Fesco | 55/368 |
| 3,373,545 | 3/1968 | Christianson | 55/341 NT X |
| 3,616,622 | 11/1971 | Friedman | 55/376 |
| 3,807,147 | 4/1974 | Schoonen et al. | 55/368 |
| 4,164,400 | 8/1979 | Wald | 55/382 |
| 4,277,266 | 7/1981 | Dick | 55/381 |
| 4,411,674 | 10/1983 | Forgac | 55/341 NT X |
| 4,436,621 | 3/1984 | Picker | 55/378 X |

Primary Examiner—Robert Spitzer
Attorney, Agent, or Firm—Robert A. Spray

[57] ABSTRACT

A filter device, usable as a self-contained or freestanding unit or in association with an associated air treatment installation such as a furnace or air conditioner.

A preferred embodiment has a housing in which is supported a parallel-arranged plurality of filter bags folded over to achieve high filter area in comparison to the size of the housing; and ductwork leads the incoming air to the filter bags, which are formed of HEPA paper for screening out even extremely small particles.

The housing is hermetically sealed; and there is provided a blower for drawing in air, and causing it to pass through the filter bag system and into the interior of the housing, and then out the housing outlet for entrance to the associated air treatment installation.

Other features include a magnetic feature for connecting individual ones of the filter bags separately to the duckwork, and for holding them tightly to the ductwork, yet they are easily releasable when filter bag-change is needed, a condition shown by a pressure gauge responsive to pressure in the manifold by which the air to be treated passes in its route to the filter bags.

22 Claims, 3 Drawing Sheets

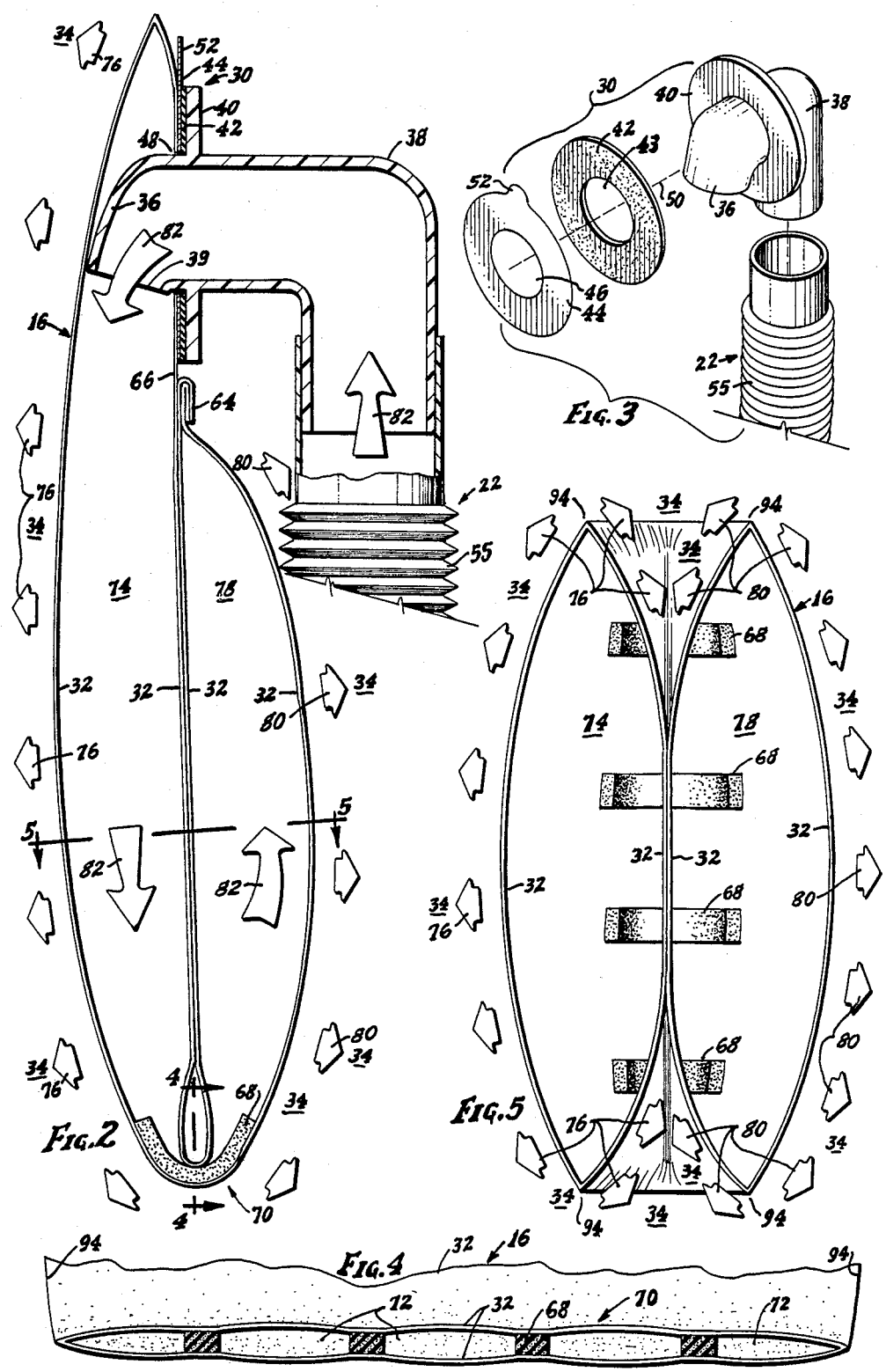

AIR FILTER APPARATUS

FIELD AND BACKGROUND OF THE INVENTION

The present invention relates to filter apparatus, for both home residence use and for commercial buildings.

More particularly, the invention relates to and provides air-filter apparatus which can be used as a self-contained or free-standing unit, or in association with other air treatment apparatus of the building, such as a furnace or an air-conditioner.

For many years, the high importance of air-purity, and even the governmental enforcement of air-quality standards, have been factors of common knowledge; and those factors and other such quality-indicators such a daily-published "Air Index," and increasing awareness on improved environmental conditions and need for ecological improvements, have emphasized to all thinking persons the recognition of air-quality improvement to be a desired goals, even a universal goal so apparent and so much illustrated in many ways that further emphasis is surely here unnecessary.

AIR-QUALITY IMPROVEMENT ATTEMPTS THROUGH THE YEARS

Fortunately, the need for better air quality was at least recognized many decades ago; and although we today are the beneficiaries of long efforts of air-cleaning, a continued increase of air-pollution has been caused by increased population, increased commercially-caused pollution, increased use of hydrocarbon fuels, etc.

In the past, and still, the improvements in air quality can be classed in various general ways, i.e., (a) attempts to reduce the introduction of air contaminants, and (b) methods of filtering or cleansing; and as to the latter, the general methods are to precipitate, to scrub, or to filter; and many types of devices have been used in these attempts of air purification.

It is that last-named method of air-cleansing to which the present invention is involved. And, recognizing that all methods of filtering, as indeed all the other methods of air cleaning, have been beneficial to their own extent, the present method and apparatus is believed to provide advantages in several respects, both as to individual features and to them as integrated into an overall apparatus, providing the advantages particularly of the combination of various features and details of the invention.

The particulars of improvement will be detailed in this description.

SUMMARIZATION OF THE PRESENT INVENTION

According to the inventive concepts, the filter device of the present invention in its preferred embodiment includes a housing, with a plurality of filter bag devices formed of HEPA paper and supported in a parallel arrangement to receive air from a manifold. The housing is hermetically sealed except as to its inlet and outlet, and a blower means in the housing causes air to flow inwardly of the housing and through the filter bag devices, into the interior of the housing, and out its outlet for entrance to the associated air treatment installation.

Magnetic means provides a tight but releasable connection of the filter bag means to the inlet ductwork; and the manifold is provided with a pressure-sensing means which gives an indication, outwardly of the housing, of the pressure in the filter bag system, thereby giving an indication of the need to replace filter bags, that replacement itself an easy task as assured by their releasable magnetic holding.

The filter bags are supported in a fold-over manner, thus achieving substantially more filter area per filter bag of the system than that of a straight bag whose size would be limited by the size and shape of the housing; and supports are provided for each bag to avoid an air-flow-blocking crease at the filter bag fold, further giving advantage by giving longer effective bag life.

By the features thus summarized, and particularly by them in their effect as a combination, and in contrast to the prior art known to the inventor and to what even by hindsight might be asserted as suggestions from the prior art, the present invention provides an advantageous apparatus for achieving the goal of effective air filtration.

DESCRIPTION OF THE DRAWINGS

The above description of the novel air filter apparatus system is of somewhat introductory and generalized form. More particular details, concepts, and features are set forth in the following and more detailed description of an illustrative embodiment, taken in conjunction with the accompanying drawings, which are of somewhat schematic and diagrammatic nature, for showing of the inventive concepts and illustrating the use of the components of the invention in this embodiment.

In the drawings:

FIG. 2, in greatly enlarged scale, is a vertical cross-sectional view through one of the filter bag units as connected to a delivery neck of the airflow ductwork, illustrating the airflow as indicated by the arrows, as the air travels along the interior of the folded-over filter bag and outwardly through the HEPA walls of the filter bag to the interior of the housing or cabinet;

FIG. 3, in somewhat reduced scale, is a pictorial view, in so-called "exploded" nature, illustrating the connection of the delivery neck to the flexible tubing of the delivery ductwork, and the magnetic means for tightly but easily releasably holding of the filter bag to the delivery neck;

FIGS. 4 and 5, on the same scale as FIG. 2, are cross-sectional views illustrating details of the folded-over filter bags, and more particularly;

FIG. 4 is vertical cross-sectional view, taken as by Section-line 4—4 of FIG. 2, showing the effect of the supports which avoid an air-blocking crease at the fold portion of the filter bag;

FIG. 5 is a horizontal cross-sectional view, taken as by Section-line 5—5 of FIG. 2, diagrammatically illustrating by arrows the air flow outwardly through the folded filter bag walls, both those walls facing outwardly and those facing inwardly of the folded-over portion of the bag;

DETAILED DESCRIPTION OF PREFERRED EMBODIMENT

Figure 1:
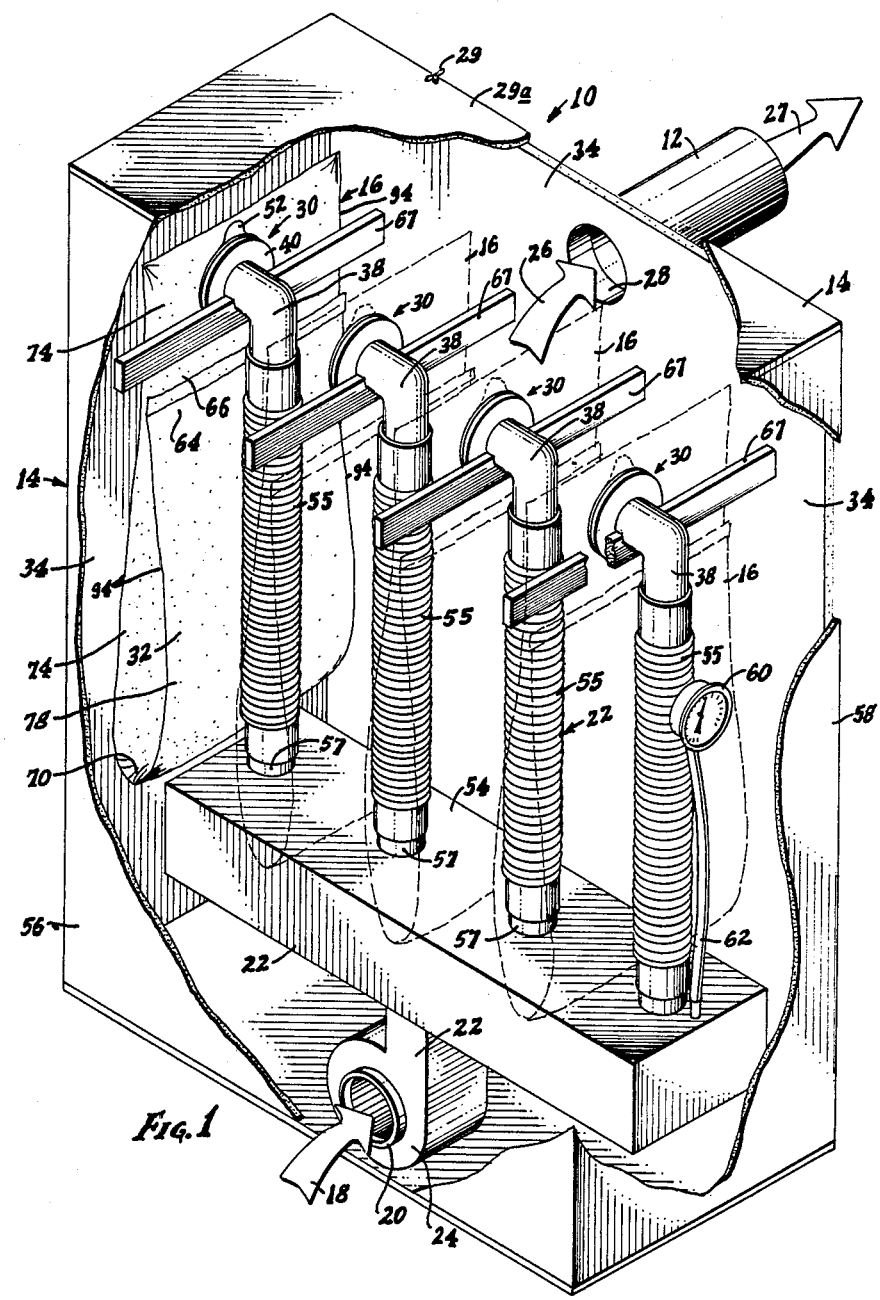
FIG. 1 is an overall pictorial illustration of an air filter apparatus, portions shown as broken away or indicated merely by broken lines so as to better illustrate details otherwise hidden, showing a four-bag embodiment of the device, the arrows indicating the direction of air flow, and the ductwork at the outlet indicating diagrammatically the entrance of the filtered air to associated air treatment apparatus such as furnace or air conditioner.

As shown in the drawings, the present invention provides a novel and advantageous filter device 10 having a variety of optional uses. That is, the device 10 may be used (as shown in the drawings) in association with an associated air treatment installation such as a furnace or air conditioner, as indicated by ductwork 12, or as a free-standing or self-contained unit; and, depending on the number of its filter units it may be used for residential or commercial building use.

Its most conspicuous components are its overall cabinet or a housing 14, and its plurality of filter bag means 16 supported in the housing 14.

Arrows indicate the path of air flow, and in FIG. 1 the arrow 18 indicates the entrance of the air to the housing inlet means 20 for admission of air to be filtered; and, provided in the ductwork 22 communicating the inlet means 20 with the filter bag means 16, is a blower means 24 which provides the option of use of the device 10 as a free-standing unit.

Alternatively, when connected to associated air treatment apparatus, as indicated by the conduit 12 and arrows 26 and 27 leading the filtered air from the housing or cabinet 14, the housing 14 itself being hermetically sealed except as to its inlet 20 and outlet 28, the device 10 and its filter bag devices 16 are assisted as to air flow by the negative pressure which is caused by the inlet air-draw effect as would be caused by the blower means (not shown) of the associated furnace or other associated air treatment installation indicated at 12. (The sealing of the cabinet 14 is indicated by a wing nut means 29 for tightly but removably holding the cabinet lid 29a to the cabinet, a suitable sealing gasket or the like (not shown) being understood as used along all the cabinet's wall-joints.)

A feature of special advantage is that there are provided releasable connection means 30, more fully detailed herein as of magnetic nature, which connect the filter bag means 16 to the inlet ductwork 22; and with that connection established, it will be seen in the overall presentation of FIG. 1 that the arrangement of the various components provides that air flowing inwardly through the inlet 20 and inlet ductwork 22 is caused to pass through the walls 32 of the filter bag means 16 into the interior 34 of the housing 14, and out its outlet 28 for entrance to the associated air treatment installation indicated at 12. (Particulars of that air flow through the filter bags, especially as shown in FIGS. 2 and 5, are detailed below.)

The releasable magnetic means 30, which are provided for supporting the filter bag means 16 at the connection of the inlet ductwork 22 and the filter bag means 16, are provided with openings which are communicative merely by the bringing them into registration, as now detailed in the illustrated form.

That is, the outlet 36 of a delivery neck 38 of inlet ductwork 22 has an opening 39 (outlet 36 being downwardly bent for directing the air flow into the bags 16), the outlet 36 of neck 38 extending downstream from a ferrous metal support plate 40. A ring-shaped piece 42 of magnetic material is pushed onto the support plate 40, it having an opening 43, and a ring-shaped piece 44 (very thin) of ferrous metal is secured to each filter bag 16, the piece 44 having an opening 46, and the filter bag 16 having a corresponding opening 48 in wall 32.

Thus, with the magnetic piece 42 held magnetically onto the support plate 40, the attachment of a bag 16 onto the inlet ductwork 22 requires merely the placing of a filter bag 16 against the inlet ductwork 22 by directing the bag-ring 44 into registry and contact with the magnetic piece 42 on the support plate 40, the openings 46 and 43 being aligned, as indicated in FIG. 3 by installation-line 50 and as shown assembled in FIGS. 1 and 2.

The arrangement thus provides the filter bag means 16 and the inlet ductwork 22 with sealing components of co-operative magnetic and ferrous materials which hold the registration of the openings 48 and 46 of the filter bag means 16 and the openings 43 and 39 of the inlet ductwork 22 to be hermetically sealed by that connection to the ductwork's delivery neckpiece 38.

For convenience of release, the bag-piece 44 (which is its magnetic means component) is provided with an extension tab 52 which extends away from the ring 42 (which is the magnetic means component of the inlet ductwork 22 and its neckpiece 38), thereby providing a manually graspable tab means 52 by which the magnetic holding of the registration of the filter bag means 16 and the inlet ductwork 22 and its neckpiece 38 may be released.

In the form shown, the intake ductwork 22, in addition to the inlet 20 and blower 24, includes a manifold 54 which communicates, in parallel, through flexible hose sections 55 leading respectively to a neckpiece 38, each of the filter bag means 16 with the inlet means 20. (The inlet 20, although perhaps unclear in the isometric view of FIG. 1, opens to the cabinet face 56, and is indicated by arrow 18, i.e., through face 56 to draw incoming air into the blower 24.) The spaced outlets of the manifold 54 are shown at 57, connected to the tubes 55.

Also opening onto a face 58 of the cabinet 14 is a pressure gauge 60 whose sensor tube 62 leads to a pressure-sensing means (not shown) in the manifold 54 which gives an indication, outwardly of the housing 14, of the pressure in the inlet ductwork 22, thereby giving an indication of the need to replace filter bag means 16 whose walls 32 get increasingly laden with dirt, dust, or other particles of pollution during operativity of the device 10.

Still another feature of advantage, and like the other features contributing to the advantages of the overall combination, each of the filter bag means 16 is supported in a fold-over manner (FIGS. 1 and 2), thus achieving substantially more filter area of walls 32 of the filter bag means 16 than that of a straight bag whose size would be limited by the size and shape of the housing 14; and in the form of bag units 16 shown, the fold-over support of the bag units 16 is by securing the bag-end 64 remote from the bag inlet 48 to a bag-portion 66 adjacent the bag inlet 48. (The bag-ends 66 and 64 are shown supported adjacent the top of the cabinet 14, and spaced laterally therein, by the delivery necks 38 being supported in a high and spaced arrangement by cross pieces 67 suitably secured to the cabinet 14 or its framing.)

The views of FIGS. 2, 4, and 5 also illustrate another feature of the combination, i.e., the provision of a support means 68 of sufficient rigidity as to avoid an airflow-blocking crease at the fold 70 of the fold-over type filter bag units 16, thus assuring an opening 72 of the bag 16 (i.e., a separation there of the bag walls 32) which assures that the air to be treated may flow to all portions of the bag 16, including not only its initial or hang-down portion 74 and flow outwardly of those portions of the bag walls 32 as indicated by arrows 76, but through the fold-opening 72 to the bag's folded-end portion 78 adjacent the bag-end 64, and outwardly of those portions of the bag walls 32 as indicated by arrows 80. (This air flow through neckpiece 38, its outlet 39 and through both portions of the bag units 16, is indicated in FIG. 2 by arrows 82.)

Such support means 68 are shown formed from strips 68 of soft material, such as sponge rubber or the like, amply sturdy to provide the spacing function of the bag walls 32 yet soft enough to not rip or tear the bag walls 32 which, as stated above, are provided of HEPA paper, whose close porosity provides a filtering of air particles as minute as only 0.3 microns.

The extremely small size of particles filtered assures very high quality of air, and correspondingly gives higher advantage to the ease of replacement of the filter bags 16, for, even in use of the device 10 with air which has been relatively cleaned by other means, the HEPA paper filtering effect filters out small pollution particles which pass by other filter or air-cleaning or precipitating apparatus. (The initials "HEPA" for the preferred bag-wall 32 material, stand for High Efficiency Particulate Assembly.)

Figure 7:
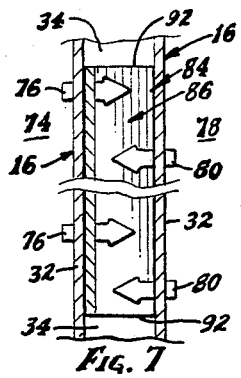
FIG. 7 is a fragmental top view, generally as would be shown as taken by Section-line 7—7 of FIG. 6, of the spacer member of FIG. 6.
Figure 6:
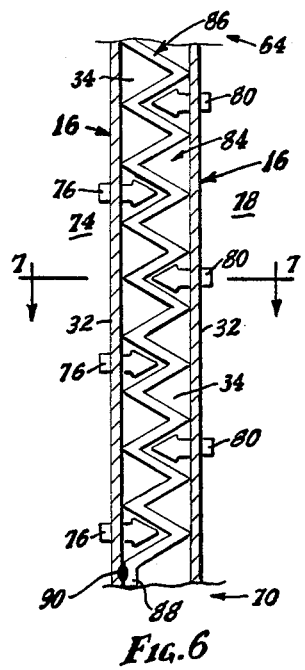
FIG. 6 is a fragmental vertical cross-sectional view, in enlarged scale, illustrating a modification in which a corrugated spacer member is employed to hold the bag-walls of the fold-over portions more separate.

As shown in FIGS. 6 and 7, spacer means 84 may be provided to more maximize the effective flow-area of the fold-over concept.

That is, in contrast to the showing of the invention in FIG. 5, if it is believed that the inwardly-directed air flow throughout the fold-over juxtaposed portions of bag-portions 74 and 78 (as is diagrammatically shown in FIG. 5 by the rightward-facing arrows 76 and the leftward-facing arrows 80) is blocked too much by the adjacent one of those bag-portions, a separation or spacer means may be provided.

As shown in FIGS. 6 and 7 the spacer means 84 is shown provided by a laterally corrugated spacer member 86, which extends the full vertical length of the juxtaposed bag-portions 74 and 78, which, as shown in FIG. 2, are from the fold portion 70 substantially or fully upward to the bag-end 64.

Both ends 88 of the support member are attached, as by glue or other adhesion 90 to one of the bag walls 32; and the spacer member 86 extends substantially or fully the entire width of the bag portions 74 and 78, the lateral end edges 92 of the separator member 86 being spaced substantially as far as the bag walls 32 extend transversely of the cabinet 14, to the lateral end-edges 94 of the bag.

CONCLUSION

It is thus seen that an air filter or air cleaner device, constructed and used according to the inventive concepts herein set forth, provides novel concepts of a desirable and advantageous device, particularly in their overall combination, yielding the advantages of filter apparatus which provides effectiveness of its operation, ease of bag-replacement, and monitored operativity to indicate the need of bag-replacement, usefulness in a variety of use-situation and air-cleaning needs, and other advantages as herein set forth.

In summary as to the nature of the overall device's advantageous concepts, their inventiveness is shown by novel features of concept and construction shown here in advantageous combination and by the novel combination not only being different from all the prior art known, but because the achievement is not what is or has been suggested to those of ordinary skill in the art, especially realistically considering this as a combination comprising components which individually are similar in nature to what is well known to most persons, surely including most of the many makers of air filter apparatus and devices.

No prior art has suggested the modifications of any other prior art to achieve the particulars of the novel concepts here achieved, with the special advantages which the overall device provides; and quite certainly no particular combination of prior art details as here presented in this overall combination has been suggested by the prior art, this achievement in its particular details being a substantial and advantageous departure from prior art, even though the prior art has had analogous details for many years. And particularly is the overall difference from the prior art significant when the non-obviousness is viewed by a consideration of the subject matter of this overall device as a whole, as a combination integrally incorporating features different from the prior art, in contrast to merely separate details of novelty themselves, and further in view of the prior art devices not achieving particular advantages here achieved by this combination.

Accordingly, it will thus be seen from the foregoing description of the invention according to this illustrative embodiment, considered with the accompanying drawings, that the present invention provides new and useful concepts of a novel and advantageous air filter device having and yielding desired advantages and characteristics in formation and use, and accomplishing the intended objects, including those hereinbefore pointed out and others which are inherent in the invention.

Modifications and variations may be effected without departing from the scope of the novel concepts of the invention; accordingly, the invention is not limited to the specific embodiment, or form or arrangement of parts herein described or shown.

I claim:

1. An air filter device for association with an associated air treatment installation such as a furnace or air conditioner, comprising, in combination:
   a housing,
   filter bag means supported in the housing,
   the housing having an inlet means for admission of air to be filtered,
   ductwork communicating the inlet means with the filter bag means,
   the housing having an outlet means,
   the housing being hermetically sealed except as to its inlet and outlet,
   releasable connection means connecting the filter bag means to the ductwork, and
   blower means causing flow of air inwardly through the inlet means,
   the arrangement providing that air flowing inwardly through the ductwork is caused to pass through the filter bag means, into the interior of the housing, and out the outlet, for entrance of the associated air treatment installation;
   and the filter bag means comprises a plurality of individual filter bag means, and the ductwork includes a manifold which communicates, in parallel, each of the individual filter bag means with the inlet means, and each of individual filter bag means is individually connected to the ductwork for separate releasability.

2. The invention as set forth in claim 1, in a combination in which magnetic means are provided for supporting the filter bag means, the ductwork and the filter bag means being provided with openings which are communicative merely by the bringing into registration their respective openings, the filter bag means and the ductwork being provided with sealing components of co-operative magnetic and ferrous materials which hold the registration of the openings of the filter bag means and the ductwork to be hermetically sealed.

3. The invention as set forth in claim 2, in a combination in which the magnetic means component of the filter means is provided with an extension which extends away from the magnetic means component of the ductwork, providing a manually graspable tab means by which the magnetic holding of the registration of the filter bag means and the ductwork may be released.

4. The invention as set forth in claim 2, in which the filter bag means is provided of HEPA paper.

5. The invention as set forth in claim 1, in a combination in which the ductwork includes ductwork portions extending in parallel from the manifold, each of the individual filter bag means being connected to a respective one of the ductwork portions at a location remote from the manifold.

6. The invention as set forth in claim 5, in a combination in which the ductwork is provided with a pressure-sensing means which gives an indication outwardly of the housing, of the pressure in the ductwork, thereby giving an indication of the need to replace filter bag means, the pressure-sensing means being operatively connected to the interior of the manifold, thereby to sense ductwork pressure.

7. The invention as set forth in claim 5, in a combination in which the filter bag means is supported in a fold-over manner, thus achieving substantially more filter area of the filter bag means than that of a straight bag whose size is limited by the size and shape of the housing.

8. The invention as set forth in claim 7, in a combination in which the filter bag means is provided with a support means of sufficient rigidity as to provide a separator which spaces apart adjacent walls of the filter bag means adjacent the crease, thereby to avoid an air-flow-blocking crease at the fold of the fold-over filter bag means.

9. The invention as set forth in claim 5, in which the filter bag means is provided of HEPA paper.

10. The invention as set forth in claim 1, in a combination in which the ductwork is provided with a pressure-sensing means which gives an indication outwardly of the housing, of the pressure in the ductwork, thereby giving an indication of the need to replace filter bag means.

11. The invention as set forth in claim 10, in which the filter bag means is provided of HEPA paper.

12. The invention as set forth in claim 1, in a combination in which the filter bag means is supported in a fold-over manner, thus achieving substantially more filter area of the filter bag means than that of a straight bag whose size is limited by the size and shape of the housing.

13. The invention as set forth in claim 12, in a combination in which the filter bag means is provided with a support means of sufficient rigidity as to provide a separator which spaces apart adjacent walls of the filter bag means adjacent the crease, thereby to avoid an air-flow-blocking crease at the fold of the fold-over filter bag means.

14. The invention as set forth in claim 13, in which the filter bag means is provided of HEPA paper.

15. The invention as set forth in claim 12, in a combination in which there are provided spacer means between the fold-over portions of the bag means, for separating the juxtaposed portions of the bag means and thereby assuring air-flow outwardly of the bag walls in the regions of the fold-over portions.

16. The invention as set forth in claim 15, in a combination in which the spacer means is provided by a corrugated separator member.

17. The invention as set forth in claim 1, in which the filter bag means is provided of HEPA paper.

18. An air filter device, comprising, in combination:
a housing,
filter bag means supported in the housing,
the housing having an inlet means for admission of air to be filtered,
ductwork communicating the inlet means with the filter bag means,
the housing having an outlet means,
releasable connection means connecting the filter bag means to the ductwork, and
blower means causing flow of air inwardly through the inlet means,
the arrangement providing that air flowing inwardly through the ductwork is caused to pass through the filter bag means, into the interior of the housing, and out the outlet;
and the filter bag means comprises a plurality of individual filter bag means, and the ductwork includes a manifold which communicates, in parallel, each of the individual filter bag means with the inlet means, and each of individual filter bag means is individually connected to the ductwork for separate releasability.

19. The invention as set forth in claim 18, in a combination in which magnetic means are provided for supporting the filter bag means, the ductwork and the filter bag means being provided with openings which are communicative merely by the bringing into registration their respective openings, the filter bag means and the ductwork being provided with sealing components of co-operative magnetic and ferrous materials which hold the registration of the openings of the filter bag means and the ductwork to be hermetically sealed.

20. The invention as set forth in claim 18, in a combination in which the ductwork includes ductwork portions extending in parallel from the manifold, each of the individual filter bag means being connected to a respective one of the ductwork portions at a location remote from the manifold.

21. The invention as set forth in claim 18, in a combination in which the ductwork is provided with a pressure-sensing means which gives an indication outwardly of the housing, of the pressure in the ductwork, thereby giving an indication of the need to replace filter bag means.

22. The invention as set forth in claim 18, in a combination in which the filter bag means is supported in a fold-over manner, thus achieving substantially more filter area of the filter bag means than that of a straight bag whose size is limited by the size and shape of the housing, and the filter bag means is provided with a support means of sufficient rigidity as to avoid an air-flow-blocking crease at the fold of the fold-over filter bag means.

* * * * *